United States Patent
Giaretta et al.

(10) Patent No.: US 6,510,265 B1
(45) Date of Patent: Jan. 21, 2003

(54) HIGH-SPEED MULTI MODE FIBER OPTIC LINK

(75) Inventors: Giorgio Giaretta, Westfield, NJ (US); Steven Eugene Golowich, New Providence, NJ (US); Paul Francis Kolesar, Middletown, NJ (US); Martin C Nuss, Holmdel, NJ (US); Albert John Ritger, Lawrenceville, GA (US); Ian A White, Dunwoody, GA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/552,773

(22) Filed: Apr. 20, 2000

Related U.S. Application Data

(60) Provisional application No. 60/130,413, filed on Apr. 21, 1999.

(51) Int. Cl.[7] .................................................. G02B 6/42
(52) U.S. Cl. .......................................... 385/38; 385/33
(58) Field of Search ................................ 385/31, 33–35, 385/38

(56) References Cited

U.S. PATENT DOCUMENTS 6,064,786 A * 5/2000 Cunningham et al. ........ 385/38
6,157,757 A * 12/2000 Giaretta et al. ............... 385/35

OTHER PUBLICATIONS

A. Koonen, "Bit–Error–Rate Degradation in a Multimode Fiber Optic Transmission Link Due to Modal Noise", *IEEE Journal on Selected Areas in Communication*, vol. SAC–4, No. 9, Dec. 1986, pp 1515–1522.

L. Raddatz et al, "An Experimental and Theoretical Study of the Offset Launch Technique for the Enhancement of the Bandwidth of Multimode Fiber Links", *Journal of Lightwave Technology*, vol. 16, No. 3, Mar. 1998, pp 324–331.

P. R. Couch et al, "Reproducible Modal–Noise Measurements in System Design and Analysis", *Journal of Lightwave Technology*, vol. LT–1, No. 4, Dec. 1983, pp 591–596.

Z. Haas, "A Mode–Filtering Scheme for Improvement of the Bandwidth–Distance Product in Multimode Fiber Systems", *Journal of Lightwave Technololgy*, vol. 11, No. 7, Jul. 1993, pp 1125–1131.

* cited by examiner

Primary Examiner—Akm E. Ullah
Assistant Examiner—Jerry T Rahll
(74) Attorney, Agent, or Firm—Barry H. Freedman

(57) ABSTRACT

A method and apparatus for overcoming modal noise penalties associated with multi-mode fiber optic links operating at high data rates on the order of 10 Gb/s. The method involves restricting the center launch condition of optical signals into the multi-mode fiber while permitting loose tolerances between source and fiber.

1 Claim, 2 Drawing Sheets

SHOWS THE DMD IMPULSE RESPONSE OF A NEW HIGH-PERFORMANCE FIBER, WITH THE SPECIFIED DMD MASK INDICATED BY SOLID LINES.

HIGH-SPEED MULTI MODE FIBER OPTIC LINK

CROSS REFERENCE TO RELATED APPLICATIONS

This application claims the benefit of U.S. Provisional Application 60/130,413 filed Apr. 21, 1999 and incorporated herein by reference.

FIELD OF THE INVENTION

This invention relates generally to the field of data communications networks and in particular to a method and apparatus for transmitting data at very high rates over multi-mode optical fiber.

BACKGROUND OF THE INVENTION

Multi-mode optical fiber is perhaps the most widely used type of transmission medium for local area networks (LANs) and as the data rates within LANs are increasing exponentially, multi-mode fiber systems have to support higher and higher data rates. The IEEE 802.3z standard (IEEE 802.3z Standard, "Media Access Control Parameters, Physical Layer, Repeater and Management Parameters for 1000 Mb/s Operation," June 1998) describes the current state of the art for Gigabit Ethernet at a data rate of 1 Gb/s, or 1.25 Gbaud including the coding overhead specified in the standard.

Even at Gigabit Ethernet rates, the capabilities of multi-mode fiber are stressed. The bandwidth performance of multi-mode fiber is usually specified for "overfilled launch conditions" that were common with light emitting diode (LED) sources. For laser sources which are required at data rates of 1 Gb/s and above, overfill launch conditions are difficult to obtain. In particular, 1000BASE-SX short-wave 850 nm VCSEL (vertical cavity surface emitting laser) Gigabit Ethernet transceivers emit light over an area comparable to the fiber core size and 1000BASE-LX sources at 1.3 micron are single transverse mode and emit only over a small (<10 micron) size area. When these sources are coupled into the center of a conventional multi-mode fiber, performance can vary significantly as described by L.Raddatz et al in an article entitled "An Experimental and Theoretical Study of the Offset Launch Technique for the Enhancement of the Bandwidth of Multimode Fiber Links," which appeared in the Journal of Lightwave Technology, Vol. 16, pp. 324–331 in 1998.

One of the reasons for this varying performance is the presence of perturbations in the index profile near the core center of many multi-mode fibers which result from the manufacturing process. While overfilled launch excites primarily higher-order modes that do not have much overlap with the center region, a single-mode laser source can couple to the low-order modes in the center of the fiber. Because of the center perturbations, conventional multi-mode fiber can show large "differential mode delay" (DMD) between low-order modes. Therefore, a laser source that excites primarily low-order modes can cause much lower transmission bandwidth compared to an overfilled launch source in such fibers. At present, center launch is therefore avoided in all multi-mode fiber optic links.

It is worth noting that center-launch has been proposed before as a method to achieve higher bandwidth in multi-mode fibers. (See, e.g, Z. Haas, M. A. Santoro, "A Mode-Filtering Scheme for Improvement of the Bandwidth Distance Product in Multimode Fiber Systems," Journal Lightwave Technology, Vol. 11, pp 1125–1130, 1993) However, the system described therein is vulnerable to bandwidth degradation as long as conventional multi-mode fiber with pronounced center perturbations is used. Also, single-mode accuracy is required to position the laser with respect to the multi-mode fiber, annihilating the alignment cost advantages of multi-mode fiber solutions. Consequently, the same authors therefore concluded that offset launch should be used to increase the bandwidth of the fiber and described that offset launch in U.S. Pat. No. 5,416,862 which issued to Haas, et al. in 1995.

For higher LAN data rates such as 10 Gigabits per second, multi-mode link problems will become even more severe. In particular, even short-wave (850 nm) sources now need to be single transverse mode. This is because multi-transverse mode sources tend to have a spectral bandwidth in excess of 0.2 nm, leading to chromatic dispersion and mode partition noise penalties over the 300-m distances that need to be supported within the Local Area Network.

Modal noise becomes a serious problem for such a high-speed multi-mode fiber link (See, e.g., A. M. Koonen, "Bit Error Rate Degradation in a Multi-mode Fiber Optic Transmission Link Due to Modal Noise," Journal of Selected Areas in Communications, SA-4, pp. 1515–1522, 1986; and P. R. Couch, R. E. Epworth, "Reproducible Modal Noise Measurements in Systems Design and Analysis," Journal of Lightwave Technology, LT-1, pp 591–595, 1983) As is known, modal noise arises for narrow linewidth sources, due to coherent interference between different mode groups that have different path lengths going through the fiber. This interference is the same phenomenon known as "speckle" in optical interferometry. The "speckle" will change in time due to mechanical movement of the fiber, or due to mode partition noise of the laser if the laser has more than a single lasing mode. However, as long as the detector captures all light, all variations in the speckle pattern average out.

Modal noise only leads to performance penalties in the presence of mode selective losses, such as occur at dirty, imperfect, or misaligned connectors. Using a 850 nm VCSEL operating with <0.2 nm linewidth, severe modal noise penalties can be observed with the standard overfill launch and 4 connections with a maximum combined loss of 1.5 dB, as specified in the IEEE 802.3z standard for Gigabit Ethernet. These penalties are so large that the link can not operate.

Operation over multi-mode fiber using a laser with narrow spectral bandwidth such as that required for short-wavelength operation (850 nm) at 10 Gb/s, or 1300 nm DFB lasers for a 4-wavelength WDM link operating at 2.5 Gb/s each, therefore is thought to be impossible due to modal noise. Although eliminating multi-mode fiber from consideration for 10 Gb/s operation is a possible solution, multi-mode fiber is preferred for backward compatibility with legacy LAN equipment.

It is therefore highly desirable to overcome the limitations cited above, and provide a stable fiber-optic link solution over multi-mode fiber, capable of operating at data rates on the order of 10 Gb/s for next-generation (10 Gigabit) Ethernet.

SUMMARY OF THE INVENTION

We have developed a method and apparatus for sending data at very high data rates (on the order of 10 Gb/s) over multi-mode fiber, for example within premise or local-area networks. According to our method Modal noise penalties in the multi-mode fiber optic link with mode selective losses and spectrally narrow sources such as single transverse mode Vertical Cavity, Surface Emitting Lasers (VCSELs) or DFB lasers are substantially eliminated using restricted center launch into the multi-mode fiber. Even in the presence of offset connectors, mode selective losses then remain small, and modal noise penalties are substantially reduced or minimized.

DETAILED DESCRIPTION OF THE INVENTION

Figure 1:
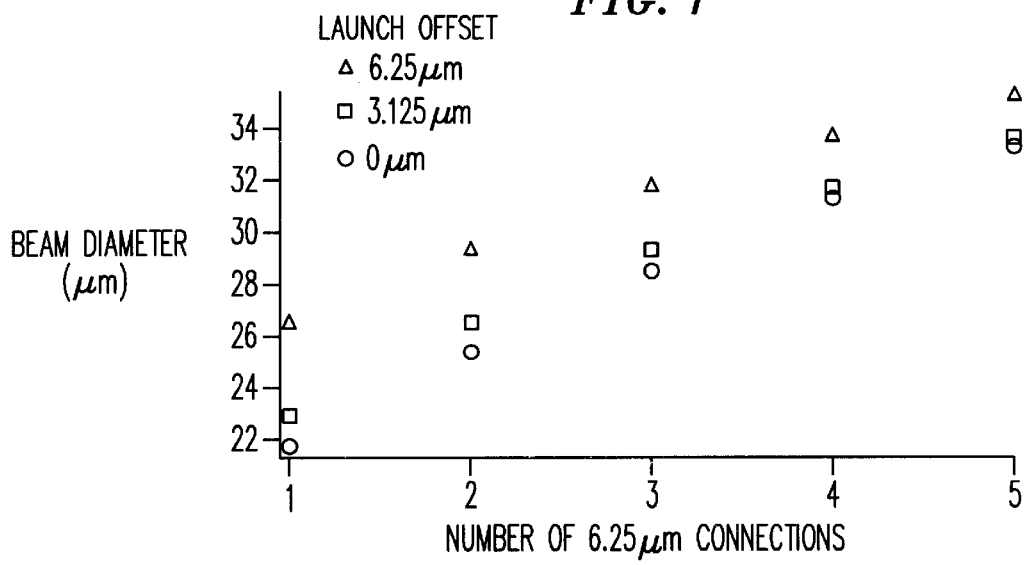
FIG. 1 is a scatter plot showing Mode field diameter at the output of a 300-m piece of 50-µm multi-mode fiber with multiple offset connectors and various launch offsets.

Today's multi-mode fibers have very limited mode mixing between mode groups, so that over distances of a few hundred meters, spreading of the light distribution within the fiber is limited. With reference now to FIG. 1, there it shows in graphical form the mode field diameter (defined as the point where the intensity drops to $1/e^2$) within the fiber at the output of several 300-m long 50 µm multi-mode fibers, for different offset launch conditions. In each case, light is launched from a single-mode laser source at 850 nm into the multi-mode fiber, using a single-mode patch cord. The light stays well confined in the center of the fiber (within ~60% of the core diameter) for source offsets up to 6.25 µm and up to five 6.25 µm offset fiber connections. A 6.25 micron offset corresponds to 0.32 dB overfilled connection loss for 62.5 micron fiber or 0.45 dB overfill loss for 50 micron fiber.

As a consequence, no substantial mode selective losses are expected as long as the laser is launched within 6.25 µm of the fiber center. Such large tolerances in launch conditions are compatible with low-cost multi-mode fiber packaging. This mode of operation has not been considered previously because of the large differential mode delay between the center mode and low order mode groups excited under such launch conditions in fibers that are on the market today. Fortunately, however, with improved fiber manufacturing techniques, the index profile of the fiber can be controlled much more accurately, and the center dip can be substantially eliminated.

A specification of a high-performance fiber is described utilizing Differential Mode Delay (DMD) masks that allows environmentally stable operation of a multi-mode fiber-optic link at bit rates around 10 Gb/s, and without the single-mode alignment tolerances required by the prior art.

Figure 2:
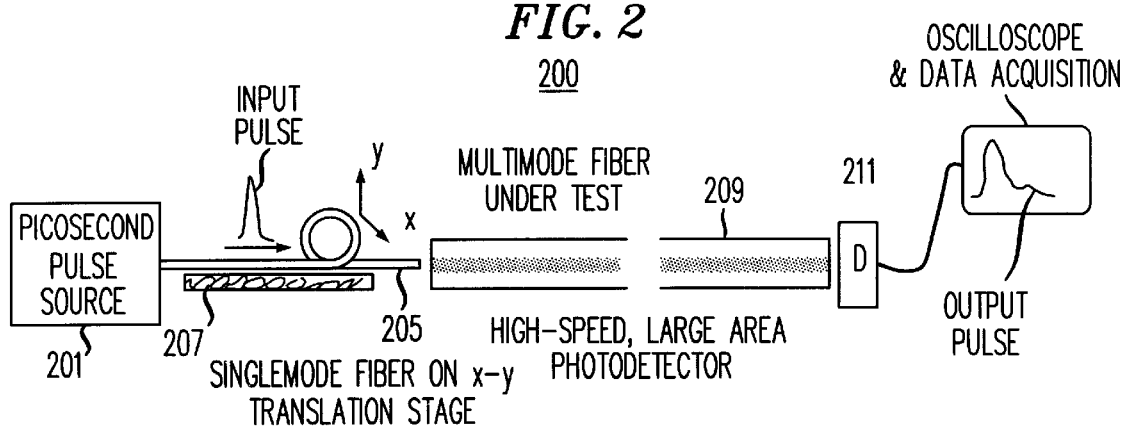
FIG. 2 is a schematic diagram of a setup to measure DMD profiles of multi-mode fiber.

With reference now to FIG. 2, there it shows an experimental setup 200 used to obtain DMD data of a test fiber. Specifically, a short-pulse source 201 (substantially shorter than the bit time considered for the system) is coupled to a single-mode fiber 205 positioned on an x-y translation stage 207. The output of the fiber is scanned in x and y direction (transversely to the fiber facet) in close proximity of the input facet of a multi-mode fiber 209 under test. The pulse shape at the output of the multi-mode fiber is measured with a high-speed detector 211 capable of capturing all the light emanating from the fiber end. The impulse response of the fiber is obtained by deconvolving the input pulse shape from the output pulse, and normalizing the energy of the pulse. The DMD response of the fiber is obtained by plotting the deconvolved output pulse shape as a function of radial offset of the single-mode launch fiber with respect to the center of the multi-mode fiber.

As a general rule, in order for the fiber to support robust operation for binary base-band signaling, up to ⅔ of the bit time may be allocated to the fiber rise and fall response times. Therefore, the impulse DMD response of the fiber needs to have a 10 to 90% transition time ($t_{10-90}$) of no more than ⅔ of the bit time, or 67 ps for a bit rate of 10 Gb/s. Alternatively, the 10 to 90% transition time of the DMD impulse response of the fiber can be determined from the Gigabit Ethernet link model scaled to higher bit rates. For example, the link model requires a fiber bandwidth of 2200 MHz-km for a 10 Gb/s 300 meters link in order to keep the inter-symbol interference penalty below 3 dB. The Gaussian 10 to 90% transition time of the fiber impulse response is then calculated to be 0.48×0.3 km/2200MHz-km=65 ps.

Figure 3:
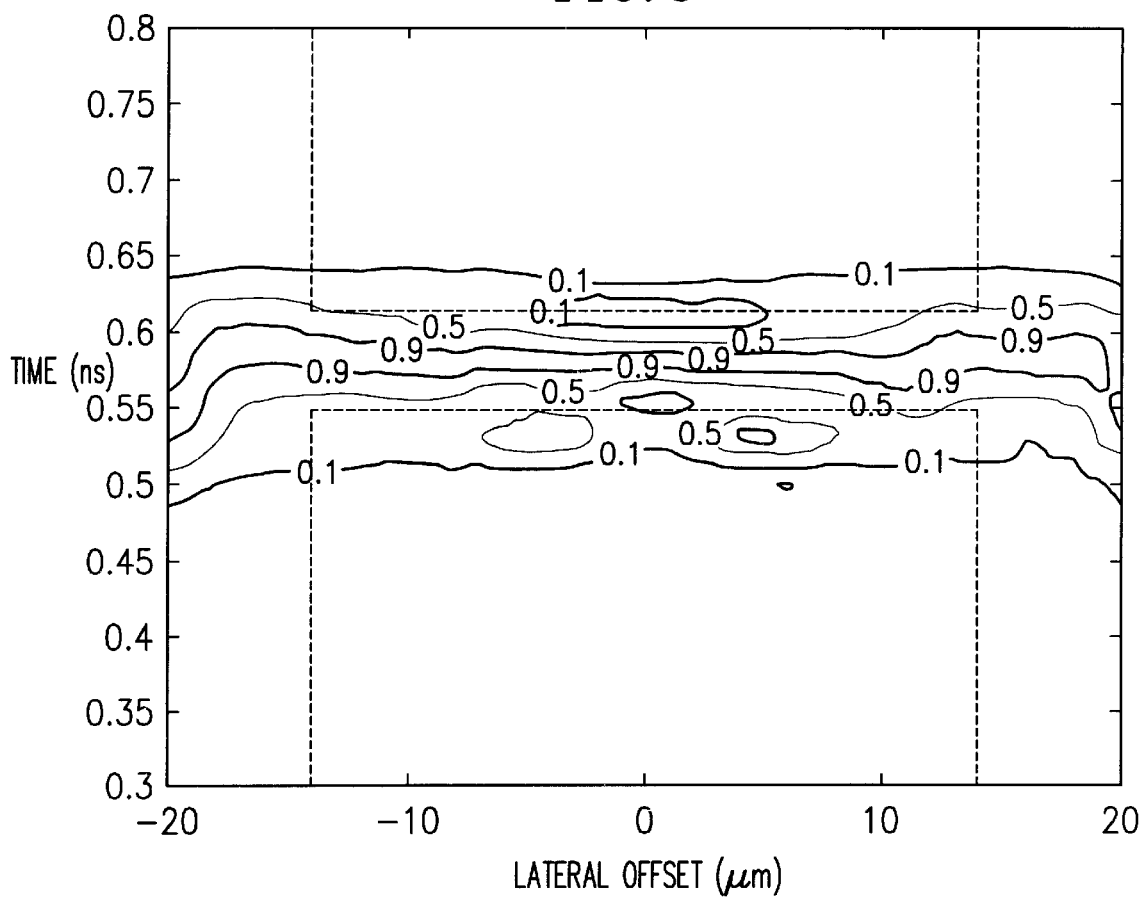
FIG. 3 is a graph showing the DMD impulse response for a new, high performance fiber.

In order to support stable operation of the link in the presence of offset connectors and multi-mode tolerances in the alignment of the laser source to the fiber core, the 10 to 90% transition time must be met across a range of core radii. Specifically, in order to support a 6.25 µm source offset and two 6.25 µm offset connections before the 300 meter length of fiber, the Full Width Half Maximum (FWHM) DMD impulse response for a Gaussian pulse shape must be less than 91 ps (1.4×$t_{10-90}$) from the center of the core out to 14 µm radius for 50 µm MMF. This requirement is illustrated by the template shown in FIG. 3.

Figure 4:
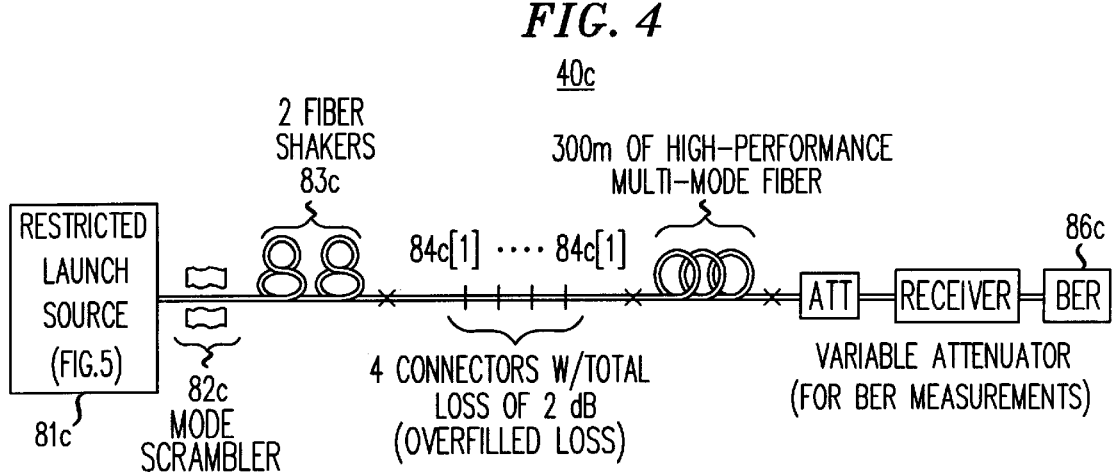
FIG. 4 is a schematic diagram of a high performance multi-mode transmission system.

With reference now to FIG. 4, there it shows an exemplary embodiment of a multi-mode fiber system 400 according to the present invention. Specifically, restricted launch source 810, including an 850 nm single-mode VCSEL transmitter, imaging optics to achieve appropriate launch conditions, an optional mode scrambler 820 to test susceptibility of the fiber system to mode mixing induced by micro-bending and cabling, 2 fiber shakers 830 operating at different shaking frequencies to test the robustness of the link to modal noise, a set of 4 connectors 840[1] ... 840[4] with various degrees of offsets with a total loss of 2 dB, a high-bandwidth receiver 850, and bit error-rate equipment 860 to measure the performance of the link.

Figure 5:
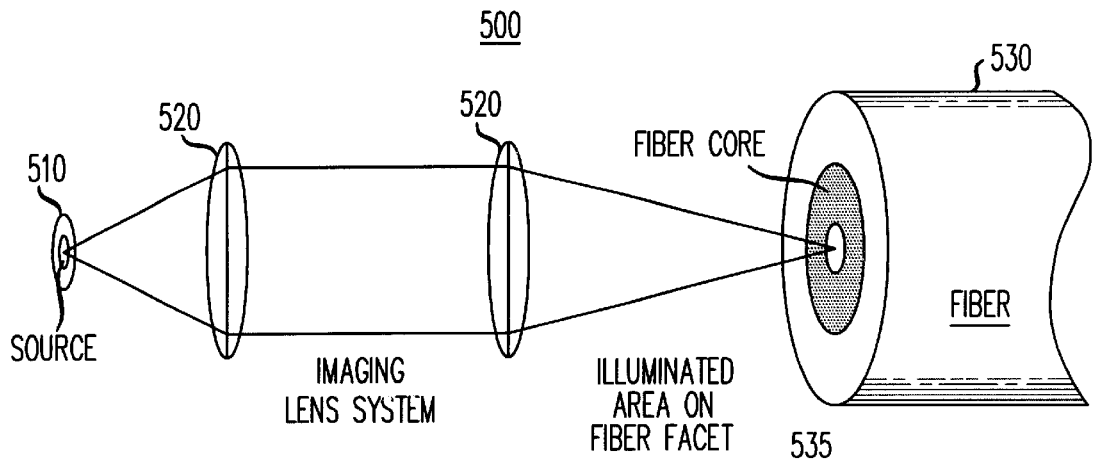
FIG. 5 is a schematic diagram depicting an embodiment of the transmitter optics resulting in restricted launch conditions in accordance with the present invention.

FIG. 5 shows an exemplary optical imaging system 500 used to obtain restricted launch conditions according to the present invention. In particular, a single-mode VCSEL 510 with a mode field diameter of roughly 3 µm is relayed by a set of imaging lenses 520 onto the input of the fiber 530, with a 2:1 magnification. Therefore, the spot size at the input face 535 of the fiber is on the order of 6 µm. Correspondingly, the numerical aperture of the laser excitation is reduced from about 0.2 directly out of the VCSEL 510 to about 0.1 into the fiber 530, resulting in excitation of only a portion of the modes of the fiber.

What is claimed is:

1. A method of sending data at data rates of approximately 10 Gb/s over multi-mode fiber CHARACTERIZED BY
    restricting a center launch condition of optical signals injected into the multi-mode fiber such that modal noise penalties associated with multi-mode fiber optic links operating at such high data rates are reduced, and FURTHER CHARACTERIZED IN THAT said multi-mode fiber has a Full Width Half Maximum (FWHM) differential mode delay (DMD) impulse response that is less than a predetermined maximum when measured from the center of the core of said multi-mode fiber to a specified radius,
    wherein said predetermined maximum is approximately 91 ps.

* * * * *